United States Patent [19]

Yamagiwa et al.

[11] 4,306,274
[45] Dec. 15, 1981

[54] DISC CERAMIC CAPACITOR

[75] Inventors: Tokio Yamagiwa; Yuzuru Kamata, both of Hitachi; Yasuro Hori, Katsuta; Rikizo Ishikawa, Ibaraki; Jun Ozawa, Hitachi, all of Japan

[73] Assignee: Hitachi, Ltd., Tokyo, Japan

[21] Appl. No.: 190,877

[22] Filed: Sep. 25, 1980

[30] Foreign Application Priority Data

Sep. 27, 1979 [JP] Japan .................................. 54/123165

[51] Int. Cl.³ .................................................. H01G 4/12
[52] U.S. Cl. ...................................... 361/321; 361/304
[58] Field of Search ............................... 361/321, 304

[56] References Cited

U.S. PATENT DOCUMENTS 2,552,653  5/1951  Stupakoff ............................. 361/321
3,581,167  5/1971  Veater ................................. 361/321
3,585,472  6/1971  Dornfeld .......................... 361/321 X Primary Examiner—Elliot A. Goldberg
Attorney, Agent, or Firm—Craig and Antonelli

[57] ABSTRACT

A ceramic capacitor comprises a column-like ceramic element having end faces provided with electrodes, respectively. A disk-like reinforcing element is secured to at least one of the electrodes in close contact therewith. The thickness T and diameter D of the ceramic element are selected so that $T/D \leqslant 0.5$ and $D_t/D \geqslant 0.6$ where $D_t$ represents the thickness of the reinforcing metal member. The dielectric breakdown field strength appearing upon application of a chopped-wave impulse voltage can be increased at least to the dielectric breakdown field strength appearing upon application of a full-wave impulse voltage.

9 Claims, 18 Drawing Figures

DISC CERAMIC CAPACITOR

BACKGROUND OF THE INVENTION

1. Field of the Invention

The present invention relates in general to a ceramic capacitor and more particularly concerns a ceramic capacitor which is suited to be used in high-voltage power instruments or equipment and is capable of withstanding a high impulse voltage such as that produced upon lightning stroke.

2. Description of the Prior Art

The ceramic capacitor generally comprises a columnlike ceramic element formed by sintering a composition containing as a main component barium titanate, strontium titanate or the like and electrode layers of silver or the like fixedly deposited at end faces of the ceramic element. Further, an insulation material is coated over the outer peripheral surface of the ceramic element with a view to evading influences of various insulation media which will surround the ceramic capacitor placed for use. The diameter D as well as the thickness T of a ceramic element are determined depending on the desired electrostatic capacity. Usually, the dimensions D and T are not more than several ten millimeters because of a molding process effected under a high pressure in the manufacture of the ceramic element.

The severest characteristic requirement imposed on the ceramic capacitor destined to be used in a high voltage power instrument is a dielectric breakdown characteristic exhibited by the capacitor when a chopped-wave inpulse voltage produced upon lightning stroke is applied. In other words, the matter is such characteristic that the lowest dielectric breakdown field strength is attained at a chopping time (usually after a lapse of several micro-seconds) which field strength is considerably low compared with the dielectric breakdown field strength produced upon application of a full-wave impulse voltage.

As is known in the art, the voltage-time characteristic or V-t characteristic of most of conventional insulators is such that the dielectric breakdown field strength is increased as the time lapse from application of a full-wave voltage becomes less. However, in the case of the ceramic capacitor, the V-t characteristic is such that the dielectric breakdown field strength becomes lowered as the time lapse from application of the full-wave voltage becomes less. Such characteristic is unique to the ceramic capacitor and disadvantageous when the ceramic capacitor is to be used in power instruments.

Since selected test voltage values for conventional power instruments or equipment are generally higher for the chopped-wave voltage than for the full-wave voltage, the power instrument incorporating the ceramic capacitor is remarkably handicapped in regard to insulation.

SUMMARY OF THE INVENTION

An object of the present invention is to provide a ceramic capacitor which is protected from degradation in insulation upon application of a chopped-wave impulse voltage.

The present invention is based on the results of experiments conducted for investigating the causes for degradation in insulation of ceramic capacitors upon application of a chopped-wave voltage. More particularly, the ceramic element is a ferrodielectric ceramic and belongs to a group of piezo-electric crystals. Accordingly, the ceramic element exhibits characteristically such a reverse piezo-electric effect that mechanical energy is generated internally of the ceramic element upon application of a voltage. It has been found that when a stress due to the mechanical energy exceeds the breakdown strength of the ceramic element, a mechanical rupture or fracture occurs and gives rise to the dielectric breakdown. Further, the direction of the mechanical rupture or crack varies depending on geometrical factors such as the shape or dimensions of the ceramic element. In this connection, the inventors have found that the crack produced in the ceramic element can be restricted to the longitudinal direction when the ratio T/D is selected not greater than 0.5 where T represents the thickness of the ceramic element with D representing the diameter thereof. Thus, it is possible to reinforce the ceramic element of a solid cylinder shape by providing reinforcing plates at the end faces of the element, respectively, to thereby prevent degradation in insulation due to the mechanical rupture.

DETAILED DESCRIPTION OF THE PREFERRED EMBODIMENTS

A ceramic element is a ferrodielectric substance and belongs to a group of piezo-electric crystals. Accordingly, the ceramic element exhibits characteristically such a reverse piezo-electric effect that mechanical energy is produced internally in the ceramic element in response to application of a voltage. Magnitude of such reverse piezo-electric effect is usually represented in terms of electric-mechanical coupling factor (i.e. mechanical energy/electric energy). The coupling factor varies depending on the compositions of the ceramic elements. In the case of the conventional ceramic elements, the coupling factor is of the order of several to some tens percentages.

By the way, the ceramic element exhibits a relatively greater compressive strength of the order of several tons per cm², while the tensile strength of the ceramic element is usually of the order of 200 to 500 kg/cm². Consequently, it may happen that a ceramic element undergoes a mechanical rupture due to the reverse piezo-electric effect before the dielectric breakdown occurs, even when the ceramic element has the electric-mechanical coupling factor of the order described above.

Figure 1:
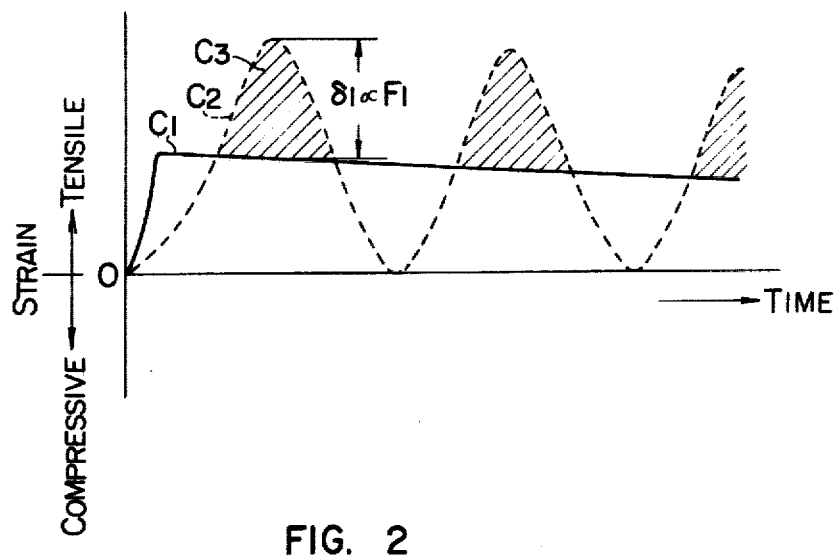
FIG. 1 graphically illustrates strains produced in a ceramic element upon application of a full-wave impulse voltage.
Figure 2:
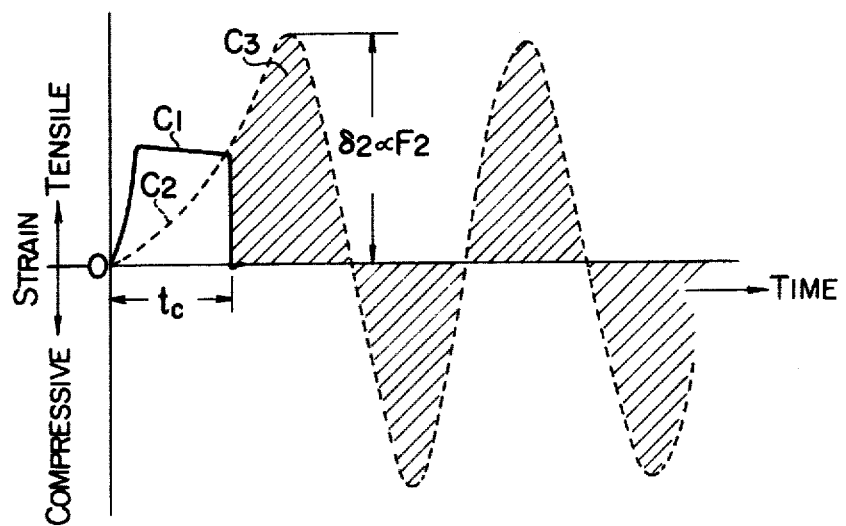
FIG. 2 graphically illustrates strains or deformations produced in a ceramic element upon application of a chopped-wave impulse voltage.

The reason why a ceramic capacitor comprising such ceramic element should exhibit the voltage-time (v-T) characteristic may be hypothetically explained as follows. Referring to FIGS. 1 and 2 which illustrate conceptionally strains produced internally in a ceramic element upon application of a chopped-wave impulse voltage and a full-wave impulse voltage, respectively, a strain represented by a curve $C_1$ is produced depending on the applied voltage, whereby the ceramic element exhibits a transient response as represented by a curve of deformation $C_2$. It is assumed that the strain $C_1$ causes no internal stress to be produced during application of voltage on the basis of the same principle as in the case of a thermal expansion of a solid mass. Accordingly, only the strain represented by hatched portions $C_3$ contributes to the generation of internal stress. The maximum stress is in proportion to the maximum strain (deformation) $\delta_1$ or $\delta_2$ which contributes to the generation of the internal tensile stress. When the maximum stress produced in response to the applied full-wave impulse voltage is represented by $F_1$ while the maximum stress produced in response to the chopped-wave impulse voltage is represented by $F_2$, the stress $F_2$ is usually greater than $F_1$. Thus, the chopped-wave voltage gives rise to a more serious problem. In this connection, it should be mentioned that the maximum stress $F_2$ produced upon application of the chopped-wave impulse voltage varies depending on a chopping time $t_c$ at which the applied voltage is chopped and the mechanical characteristic frequency of the ceramic element. Accordingly, a dielectric breakdown field strength which is produced upon application of the chopped-wave voltage and brings about the breakdown or fracture in given ceramic elements varies as a function of the chopping time $t_c$.

Figure 3:
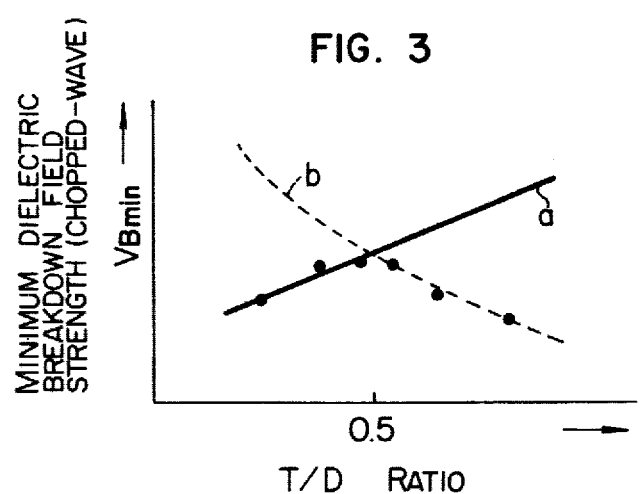
FIG. 3 graphically illustrates dielectric breakdown field strength characteristics for ceramic capacitors with dimensional factors thereof being taken as variable parameters.

Further, the dielectric breakdown field stength varies depending on the shape or dimensions of the ceramic element. FIG. 3 shows graphically the results of experiments in which the minimum dielectric breakdown field strength $V_{Bmin}$ are determined for a number of ceramic elements having different thickness T and diameter D. As can be seen from the distribution of dots in black shown in FIG. 3, the minimum dielectric breakdown field strength characteristic curve attains a maximum value at the T/D ratio of about 0.5. This can be explained by the fact that the characteristic frequency and vibration mode of the ceramic element undergo variations depending on the shape and dimension of the element.

Figure 4:
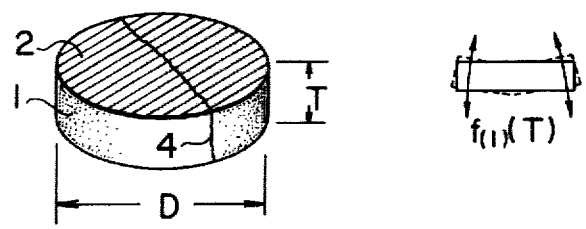
FIGS. 4 and 5 are perspective views to illustrate mechanical ruptures occurred in a ceramic element.
Figure 5:
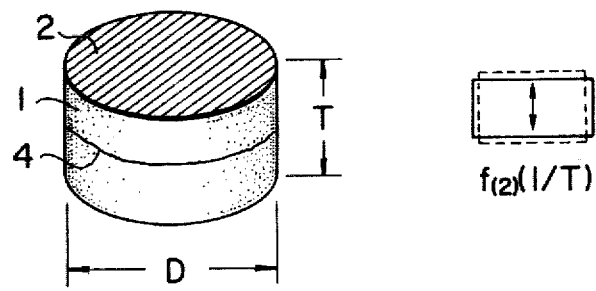

Experiments conducted by the inventors have shown that two types of mechanical breakdowns or ruptures (e.g. fracture, crack or the like) take place upon application of a chopped-wave voltage, as is illustrated in FIGS. 4 and 5. More specifically, FIG. 4 shows a longitudinal fracture produced due to a bending vibration mode, as is illustrated at righthand sides of the respective figures, while FIG. 5 shows a transverse crack produced by a tensile stress due to an axial vibration mode of a column-like ceramic element 1. In FIGS. 4 and 5, reference number 2 denotes an electrode and 4 denotes a fracture section. The bending vibration mode (as shown in FIG. 4) and the axial vibration mode (as shown in FIG. 5) bear the relationships which can be given by the following expressions (1) and (2), respectively.

$$f_{(1)} \alpha \frac{T}{D^2} \sqrt{\frac{E}{\rho}} \quad (1)$$

$$f_{(2)} \alpha \frac{1}{T} \sqrt{\frac{E}{\rho}} \quad (2)$$

Where $f_{(1)}$ and $f_{(2)}$ each represent the characteristic frequency, E represents Young's modulus and $\rho$ represents density of a given ceramic element. It is thus believed that a fracture characteristic depicted as a function of the characteristic frequency will show a fixed feature such as illustrated in FIG. 3. In this figure, a curve a corresponds to the expression (1), while a curve b corresponds to the expression (2) stated above. It is believed that the experimental results actually obtained as illustrated by a series of dots in black in FIG. 3 are brought about by the predominant one of these vibration modes (a) and (b).

It should be mentioned here that when a full-wave impulse voltage is applied, only the dielectric breakdown occurs and no mechanical breakdown (fracture) is observed. This is because the stress as produced in the ceramic element is small, as described hereinbefore.

As will be appreciated from the above description in connection with FIGS. 4 and 5, the ceramic element undergoes different fractures or cracks depending on the thickness and the diameter of the element. In order to protect the ceramic element from the transverse fracture or crack illustrated in FIG. 5, it is conceivable to apply to the ceramic element at both end faces thereof a compressing force of magnitude compatible with the breaking stress or alternatively to provide a reinforcing member at the side wall of the ceramic element. However, the use of the reinforcing member is impractical since the reinforcing member should be made of a metal material in light of the required tensile strength, which however means that the overall dielectric strength of the reinforced element is significantly reduced. In contrast, the longitudinal crack produced by the bending vibration mode as illustrated in FIG. 4 can be successfully prevented by attaching a reinforcing metal member to each of the end faces of the ceramic element without any adverse influence on the dielectric strength, since the maximum stress will occur at the planes of electrodes deposited on the end faces of the ceramic element. In other words, in order to prevent the crack with the aid of the additional reinforcing member, it is required that the ceramic element undergoes only the longitudinal fracture (illustrated in FIG. 4). To this end, the thickness T and the diameter D of the ceramic element have to be selected so that the ratio T/D is not greater than about 0.5, as can be seen from FIG. 3.

Figure 6:
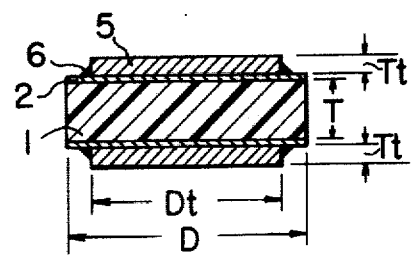
FIG. 6 shows in a vertical sectional view a ceramic capacitor according to an embodiment of the invention.

FIG. 6 shows a ceramic capacitor embodied in consideration of the experimentally obtained results described above. A column-like ceramic element 1 having a thickness T and a diameter D has silver electrode layers 2 deposited at both end faces thereof. Further, a reinforcing metal plate 5 which is destined to prevent the mechanical breakdown and serves also as a terminal member is fixedly and uniformly placed on each of the silver electrodes 2 through interposed solder layers 6, respectively. The reinforcing metal plate 5 has a diameter $D_t$ and a thickness $T_t$ and may be made of a metal material such as iron, copper, or brass.

The ceramic capacitor of the structure described above exhibits a significantly improved breaking strength to the bending stress. However, since the mechanical characteristic frequency f which exerts an important influence to the breaking strength of the ceramic capacitor will vary depending on the shape of the reinforcing plate due to the fact that each of the quantities of the righthand terms of the expressions (1) and (2) stated hereinbefore is a combined one of those of the ceramic element 1 and the reinforcing metal plate 5, there may be involved degradation in the capability of withstanding the tensile stress.

Figure 7:
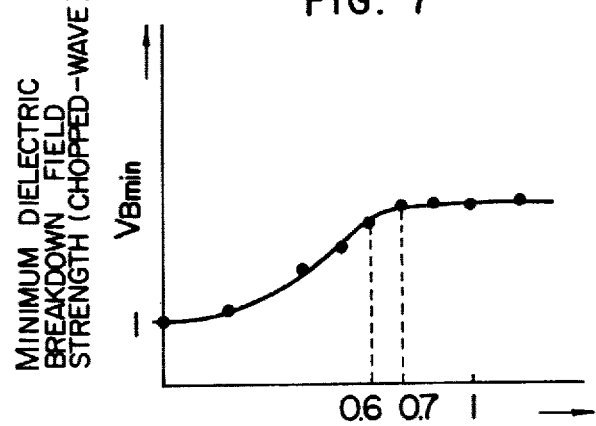
FIGS. 7 and 8 show characteristic variations in the dielectric breakdown field strength upon application of a chopped-wave impulse as a function of geometrical factors of the ceramic capacitors.
Figure 8:
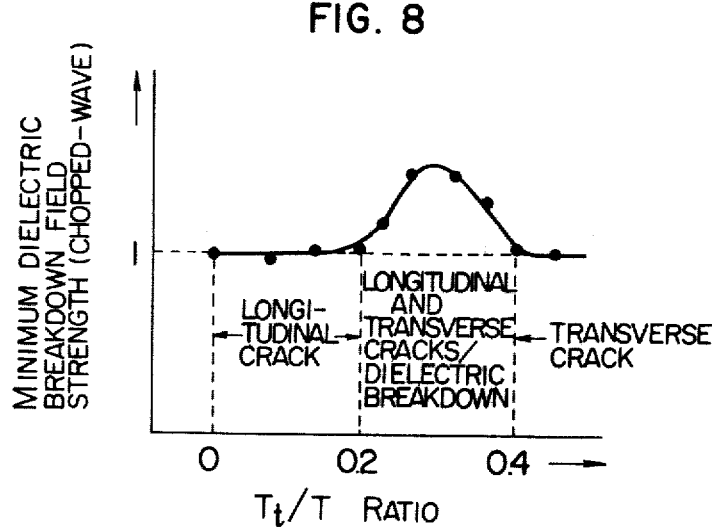

FIGS. 7 and 8 show graphically the results of experiments conducted to determine if and how the reinforcing metal plate 5 exerts influences on the breaking strength of the ceramic capacitor.

More particularly, results of the experiment in which the minimum dielectric breakdown field strength $V_{Bmin}$ of a chopped-wave voltage applied across the ceramic capacitor is measured with the ratio $D_t/D$ being varied are shown in FIG. 7. Of course, $D_t$ and D represent the diameters of the reinforcing plate 5 and the ceramic element 1, respectively. It will be seen that a significant reinforcing action can be attained at the ratio $D_t/D$ of about 0.6. Further, when the ratio $D_t/D$ is not smaller than about 0.7, a stabilized region where no longitudinal crack is produced, is obtained.

On the other hand, FIG. 8 shows results of the experiment in which the minimum or lowest dielectric breakdown field strength $V_{Bmin}$ of a chopped-wave voltage applied across the ceramic capacitor is measured with the ratio $T_t/T$ in thickness between the reinforcing metal plate 5 and the ceramic element 1 being varied. It has been found that when $T_t/T$ is not smaller than 0.4, the transverse crack is produced in the ceramic element 1. In other words, in order to enhance the breakdown strength of the ceramic capacitor to protect the ceramic element from both the longitudinal and the transverse fractures, the ratio $T_t/T$ should be selected so that $T_t/T <$ ca. 0.4 and more preferably ca. $0.2 < T_t/T <$ ca. 0.4.

Thus, by selecting the ceramic element and the reinforcing metal plate so that the conditions described above are fulfilled, the minimum dielectric breakdown field strength of the chopped-voltage applied across the ceramic capacitor is allowed to be increased, for example, to a level substantially equal to the dielectric breakdown field strength of the full-wave voltage of corresponding magnitude, which in turn means that the volume of a ceramic capacitor installed in a power instrument can be significantly decreased, while allowing the insulation property of the instrument to be enhanced.

Figure 9:
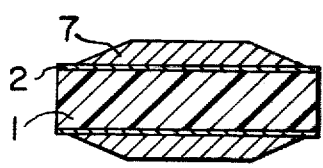
FIGS. 9, 10 and 11 show in vertical sectional views various ceramic capacitors embodied according to the invention.
Figure 10:
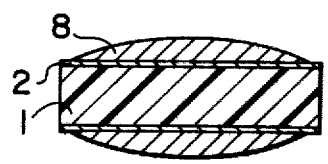

FIGS. 9 and 10 show embodiments of the ceramic capacitor according to the invention in which reinforcing metal plates 7 and 8 are progressively thinned radially outwardly with a view to evading concentration of stress at those portions of the silver electrode layers 2 and the ceramic element 1 which lie in the vicinity of the peripheral portions of the reinforcing metal plates 7 and 8. In the case of the ceramic capacitor shown in FIG. 9, the reinforcing metal plate is straightly tapered radially outwardly, while the reinforcing plate of the ceramic capacitor shown in FIG. 10 is tapered radially outwardly with a certain curvature. With these profiles of the reinforcing metal plate (7, 8), the concentration of stress at the peripheral portion of the reinforcing metal plate can be suppressed, whereby the dielectric breakdown field strength is allowed to be increased.

Figure 11:
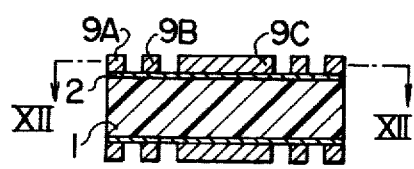
Figure 12:
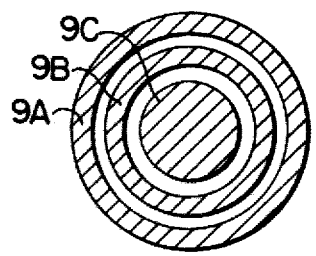
FIG. 12 is a sectional view taken along the line XII—XII in FIG. 11.

FIGS. 11 and 12 show another embodiment of the invention in which a plurality of reinforcing metal members 9A, 9B and 9C are coaxially disposed on each end face of the ceramic element 1. With this arrangement of the reinforcing metal members, not only the breakdown strength of the ceramic capacitor can be enhanced, but also a certain freedom can be assured in the disposition of the reinforcing members on the ceramic element which exhibits a large deformation in the radial direction.

Figure 13:
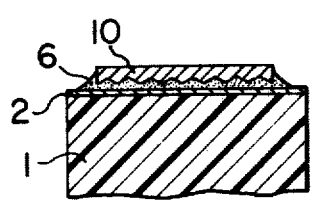
FIGS. 13, 14, 15 and 16 show in partial vertical sections various ceramic capacitor embodied according to this invention.

FIG. 13 shows a further embodiment of the ceramic capacitor according to the invention in which the surface of the reinforcing metal plate 10 to be soldered is roughened to thereby increase the effective soldering area. This structure is advantageous in that the reinforcing metal plate 10 can be secured to the ceramic element with an increased rigidity.

Figure 14:
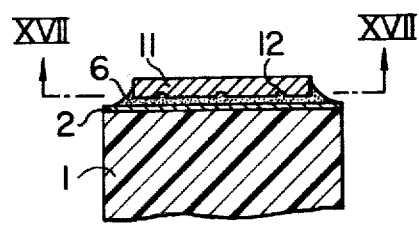
Figure 17:
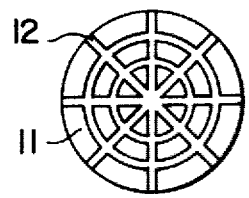
FIG. 17 is a plan view as viewed in the direction indicated by an arrowed line XVII—XVII in FIG. 14.

FIGS. 14 and 17 show a further embodiment of the ceramic capacitor according to the invention in which the surface of a reinforcing metal plate 11 to be soldered is provided with radial and coaxial grooves 12 for facilitating expansion of molten solder mass over the reinforcing plate.

Figure 15:
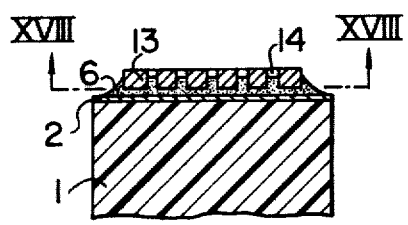
Figure 18:
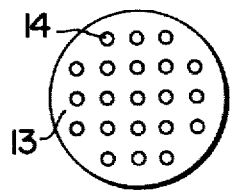
FIG. 18 is a plan view as viewed in the direction indicated by an arrowed line XVIII—XVIII in FIG. 15.

FIGS. 15 and 18 show still another embodiment of the invention in which a number of through-holes 14 are formed in each of the reinforcing metal plates 13 with a view to preventing bubbles from being left in the solder layer 6.

Figure 16:
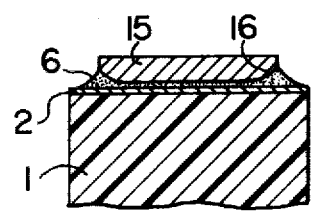

FIG. 16 shows a further embodiment of the ceramic capacitor according to the invention in which the peripheral edge portion of the surface of a reinforcing metal plate 15 to be soldered is slanted outwardly as indicated at 16 so that molten solder mass 16 can easily flow to the center portion of the reinforcing plate 15.

In the capacitors shown in FIGS. 14 to 16, the soldering is effected in a satisfactory manner, whereby the reinforcing metal plates 11, 13 and 15 can be secured to the respective ceramic elements with increased rigidity. Further, in the case of the embodiment shown in FIG. 16, dropping of solder on the peripheral surface of the ceramic element can be positively prevented, which is advantageous from the standpoint of quality control.

We claim:

1. A ceramic capacitor comprising a column-like ceramic element having a thickness T and a diameter D, electrodes deposited on end faces of said ceramic element, and disc-like reinforcing metal member having a diameter $D_t$ and secured in close contact with at least one of said electrodes, wherein $T/D \leq 0.5$ $D_t/D \geq 0.6$.

2. A ceramic capacitor according to claim 1, wherein $T_t/T \leq 0.4$ where $T_t$ represents the thickness of said reinforcing metal member.

3. A ceramic capacitor according to claim 1, wherein $$0.2 \leq T_t/T \leq 0.4$$

where $T_t$ represents the thickness of said reinforcing metal member.

4. A ceramic capacitor according to claim 1, wherein an outer peripheral portion of said reinforcing metal member is made thinner than a center portion of said reinforcing metal member.

5. A ceramic capacitor according to claim 1, wherein said reinforcing metal member is divided into a plurality of concentrical portions.

6. A ceramic capacitor according to claim 1, wherein a surface of said reinforcing metal member to be brought into contact with the electrode is roughened, and said reinforcing metal member is soldered to said electrode at the roughened surface of said reinforcing metal member to be brought into contact with the electrode, and said reinforcing metal member is soldered to said electrode at said surface provided with said groove.

7. A ceramic capacitor according to claim 1, wherein at least a groove is provided on a surface of said reinforcing metal member to be brought into contact with the electrode, and said reinforcing metal member is soldered to said electrode at said surface provided with said groove.

8. A ceramic capacitor according to claim 1, wherein a plurality of through-holes are formed in the reinforcing metal member which is soldered to the electrode.

9. A ceramic capacitor according to claim 1, wherein an outer peripheral edge portion of said reinforcing metal member is slanted to make thinner said reinforcing metal member outwardly in the radial direction on a surface of said reinforcing metal member at which said reinforcing metal member is to be soldered to the electrode.

* * * * *